US008806707B2

(12) United States Patent
Soen et al.

(10) Patent No.: US 8,806,707 B2
(45) Date of Patent: Aug. 19, 2014

(54) CYCLONIC SEPARATION DEVICE WITH ACCELERATION RAMP

(75) Inventors: Alain Soen, Saint Marcel (FR); Sylvain Reynard, Saint Pierre de Bailleul (FR)

(73) Assignee: SEB S.A., Ecully (FR)

( * ) Notice: Subject to any disclaimer, the term of this patent is extended or adjusted under 35 U.S.C. 154(b) by 595 days.

(21) Appl. No.: 12/684,989

(22) Filed: Jan. 11, 2010

(65) Prior Publication Data
US 2010/0175219 A1 Jul. 15, 2010

(30) Foreign Application Priority Data

Jan. 15, 2009 (FR) ...................... 09 00166

(51) Int. Cl.
A47L 9/10 (2006.01)
A47L 9/20 (2006.01)
B01D 45/12 (2006.01)
A47L 9/16 (2006.01)
B01D 45/16 (2006.01)

(52) U.S. Cl.
CPC ................. *A47L 9/165* (2013.01); *B01D 45/16* (2013.01); *A47L 9/1666* (2013.01); *A47L 9/1683* (2013.01); *A47L 9/1691* (2013.01); *Y10S 55/03* (2013.01)
USPC .......... 15/353; 55/459.2; 55/459.3; 55/459.5; 55/DIG. 3

(58) Field of Classification Search
CPC ....... A47L 9/165; A47L 9/1683; B01D 45/16
USPC ............. 15/315, 353; 55/459.1, 459.2, 459.3, 55/459.5
See application file for complete search history.

(56) References Cited

U.S. PATENT DOCUMENTS

| 5,950,274 | A | 9/1999 | Kilstrom | |
|---|---|---|---|---|
| 6,596,044 | B1 * | 7/2003 | Bilek et al. | 55/337 |
| 6,782,583 | B2 | 8/2004 | Oh | |
| 6,782,585 | B1 * | 8/2004 | Conrad et al. | 15/353 |
| 7,048,783 | B2 * | 5/2006 | Ponjican et al. | 95/269 |
| 8,176,597 | B2 * | 5/2012 | Stein et al. | 15/353 |
| 2003/0084536 | A1 * | 5/2003 | Yung | 15/351 |

(Continued)

FOREIGN PATENT DOCUMENTS

| EP | 0827710 A2 | 3/1998 |
|---|---|---|
| EP | 1611829 A1 | 1/2006 |

(Continued)

OTHER PUBLICATIONS

Internet Publication "Common Particles and Their Size in Microns", http://www.peakpureair.com/particles-and-their-sizes-microns.*
Intetrnet Publication "Mesh to Micron Conversion Chart", http://www.universal filters.com/MMCC.html.*

*Primary Examiner* — Bryan R Muller
(74) *Attorney, Agent, or Firm* — The Webb Law Firm

(57) ABSTRACT

A cyclonic separation device for dust and debris in vacuum cleaners, comprising a roughly cylindrical interior cyclonic chamber connected to an air intake, as well as a separator filter located in the central part of the interior chamber, comprising a tube segment to direct airflow to the air intake with this tube segment located around the roughly cylindrical interior cyclonic chamber, from a starting point to an end point near the air intake, with the cross-section of this tube segment near the end point being smaller than that near the starting point in order to form an acceleration ramp for the airflow between these two points.

10 Claims, 8 Drawing Sheets

(56) References Cited

U.S. PATENT DOCUMENTS

| | | |
|---|---|---|
| 2004/0040270 A1* | 3/2004 | Inoue et al. ............ 55/345 |
| 2004/0107530 A1 | 6/2004 | Lee |
| 2005/0132530 A1* | 6/2005 | Macleod et al. ............ 15/352 |
| 2007/0084159 A1 | 4/2007 | Oh et al. |
| 2007/0234687 A1 | 10/2007 | Ni |
| 2008/0040883 A1 | 2/2008 | Beskow et al. |
| 2009/0265883 A1* | 10/2009 | Reed et al. ............ 15/353 |

FOREIGN PATENT DOCUMENTS

| | | |
|---|---|---|
| FR | 2817138 A1 | 5/2002 |
| FR | 2848090 A1 | 6/2004 |
| WO | 2005099546 A1 | 10/2005 |

* cited by examiner

CYCLONIC SEPARATION DEVICE WITH ACCELERATION RAMP

BACKGROUND OF THE INVENTION

1. Field of the Invention

The invention pertains to a structure defining a cyclonic chamber, which we will simply call the "bowl," of a device for separation by inertia or cyclonic motion of dust and debris present in an airflow. It is particularly suited for use in a vacuum cleaner. It also pertains to a cyclonic separation device and a vacuum cleaner insofar as they comprise such a bowl.

2. Description of the Prior Art

In prior art, one type of dust and debris collection device for vacuum cleaners consists of a filter in the form of a paper bag, located between an intake tube for an airflow, containing dust and debris sucked from a surface to be cleaned and a suction fan unit. The problem with this solution is the fact that the paper filter bag eventually fills and must be replaced, which is an unpleasant and costly maintenance task for the user. In addition, the filling of the bag negatively affects the performance of the vacuum cleaner since it results in a decrease in its power.

To address these problems, a second type of dust and debris collection device in prior art operates using cyclonic or inertia separation of this dust and debris. In such a device, the airflow is directed into a cyclonic separation chamber, where it follows a vortex path that promotes the separation of debris. In practice, heavier debris is separated from the primary airflow through the centrifuge effect of the vortex flow. Next, the airflow exits the cyclonic chamber through a cylindrical grill positioned against a separation filter located in the center of this chamber, which represents a second, supplementary debris filtration operation, generally collecting dust at this stage. Finally, the dust and debris are contained in a storage area located in the lower portion of the cyclonic chamber. This area must be emptied periodically simply into a trash receptacle through a trapdoor located in the storage chamber.

A cyclonic separation device of this type may be attached to a tank-type vacuum cleaner that also comprises a collection bag, as described in documents FR2817138 and FR2848090.

Another variation of such a cyclonic separation device may be used alone, as is specifically the case for low power vacuum cleaners in which the frame is integrated into a rigid handle manipulated directly by the user, generally called upright vacuum cleaners, as described in document EP1611829.

The performance of cyclonic separation devices is dependent upon numerous parameters, including the speed and direction of the incoming airflow and the capacity of the vortex path to separate debris using the centrifuge method and to prevent a portion of the contaminated air from passing through the separator grill before the debris has been removed using the centrifuge method.

The existing solutions are not entirely satisfactory and the general objective of the invention is to offer an improved solution for cyclonic separation of debris from the airflow entering the vacuum cleaner.

SUMMARY OF THE INVENTION

This invention consists of a cyclonic separation device for debris and dust for a vacuum cleaner, consisting of an interior cyclonic chamber, roughly cylindrical in shape, with an air intake as well as a separator filter located in the central part of the interior chamber, characterized in that it comprises a segment of tube to direct airflow toward the air intake, with this tube segment located around the roughly cylindrical interior cyclonic chamber, extending from a starting point to an end point near the air intake, with the cross-section of this tube segment near the end point being smaller than the cross-section near the starting point so as to form an acceleration ramp for the airflow between these two points.

This type of acceleration ramp combined with the separation chamber makes it possible to avoid an excessively large chamber by disassociating the acceleration function from the chamber itself. In other words, for a chamber of a predetermined size, this ramp increases the effectiveness of dust and debris separation by increasing their speed. This aspect is even more significant when the device is used in vacuum cleaners with small motors that generate relatively low airflow speeds, such as upright vacuum cleaners, some of which operate on batteries.

Advantageously, the tube segment used to direct the airflow toward the air intake of the cyclonic chamber extends at least one quarter of the way around the cyclonic chamber, such that the speed of the airflow is increased significantly over the speed obtained without such a tube segment.

Preferably, the tube segment used to direct the airflow toward air intake of the cyclonic chamber extends at least two-fifths of the way around the cyclonic chamber, which delivers a more homogenous flow while permitting a more gradual airflow acceleration.

In addition, the tube segment used to direct the airflow toward the air intake of the cyclonic chamber is roughly horizontal.

Advantageously, the tube segment used to direct the airflow toward the air intake of the cyclonic chamber is linked to a vertical tube segment that decreases in size in the direction of air circulation. This vertical tube also assists in the acceleration of the airflow and allows this acceleration to continue over a significant distance, with the resulting gradual airflow acceleration limiting turbulence and thus also the accompanying noise.

In a preferable version of the invention, the cyclonic separation device includes a fixed bowl encompassing the cyclonic chamber and also holding the tube segment used to direct airflow toward the air intake of the cyclonic chamber.

This structure facilities cleaning of the separation device, while streamlining manufacturing and assembly costs.

More specifically, the bowl comprises a tubular structure with a cylindrical exterior lateral surface defining the cyclonic chamber, with the tube segment used to direct the airflow toward the air intake of the cyclonic chamber attached to the cylindrical exterior lateral surface of the tubular structure of the bowl.

In a variation, the tube is formed by a dual rib on the bowl closed off by the inside wall attached to the housing enclosing the bowl. The tube is thus essentially formed from the housing enclosing the bowl.

This invention also encompasses production versions in which the tube is formed partially on the bowl and partially on the housing enclosing the bowl.

Advantageously, the bowl includes a lower inclined, hinged section forming a door to facilitate emptying and cleaning the bowl.

This invention also encompasses a vacuum cleaner comprising a cyclonic separation device for dust and debris corresponding to any of the characteristics previously described.

Advantageously, the vacuum cleaner is an upright vacuum cleaner comprising a housing installed in its handle to hold the cyclonic separation device corresponding to any of the characteristics previously described, in which the bowl is fixed in place, with the housing including one connector in its lower portion attached to a segment of the bowl's vertical tube and a second connector in its upper portion attached to the outlet of the cyclonic separation device.

The elements, characteristics and advantages of this invention shall be detailed in the following non-restrictive description of a specific embodiment, which references the following attached figures:

DETAILED DESCRIPTION OF THE INVENTION

Figure 1:
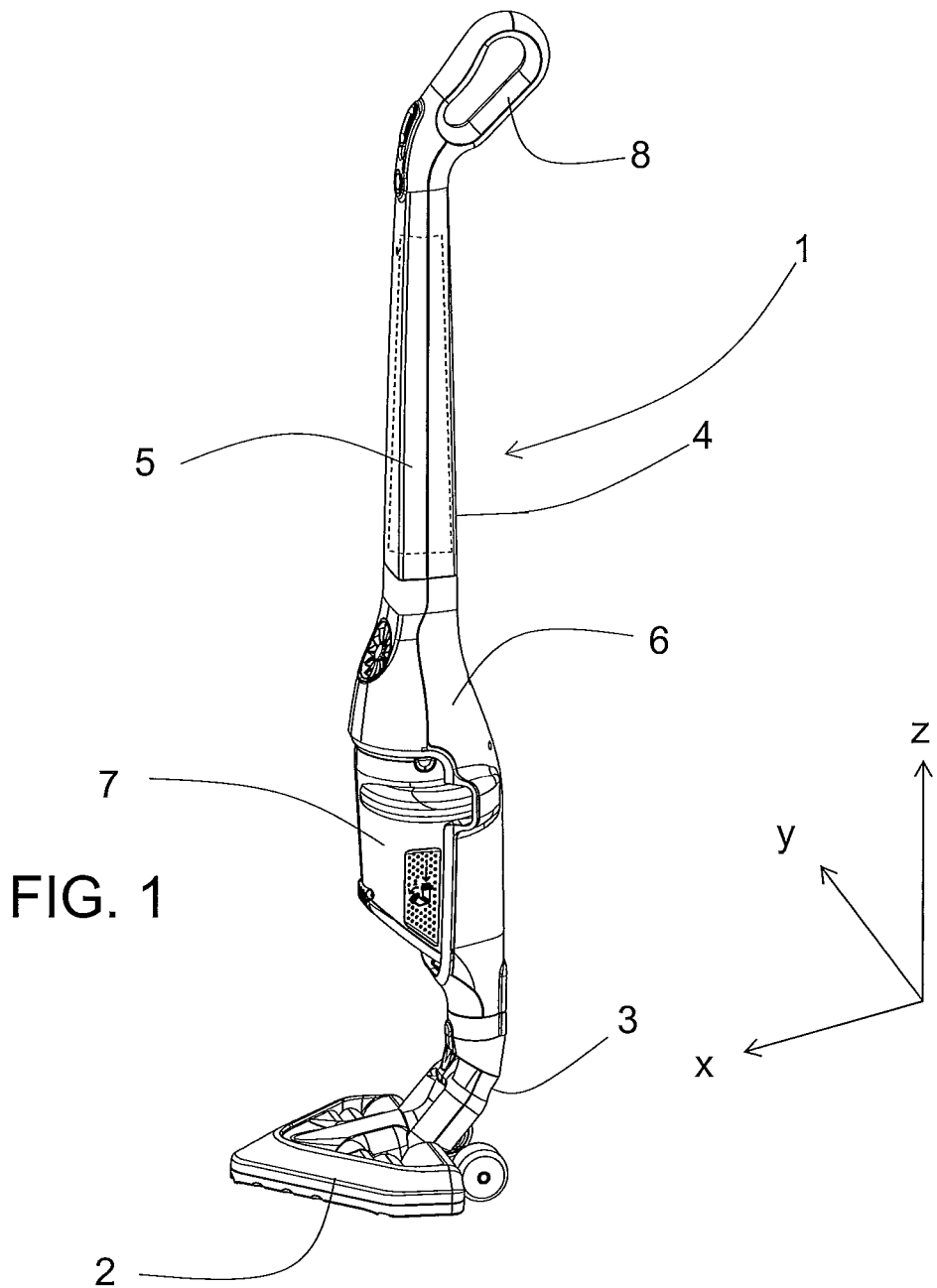
FIG. 1 depicts a perspective overview of an upright vacuum cleaner corresponding to one embodiment of the invention.

FIG. 1 depicts an upright vacuum cleaner (1), comprising a triangular suction device (2) connected to a handle (4) by an intermediate connective section (3). The term handle in this context refers not only to the longitudinal part of the device ending in a handle (8) at its upper end, but also to the various elements connected to the longitudinal part that form the frame, including a battery (5), a motor (6) and a cyclonic debris separation and storage device (7).

For the following description we will define axis "z" as the axis of the vacuum cleaner handle (4), corresponding to a roughly vertical axis in the vacuum cleaner's resting position depicted in FIG. 1, longitudinal axis "x" as the axis perpendicular to axis z bisecting the handle (4) from back to front along its plane of symmetry, and axis "y" as the transversal axis perpendicular to axes "x" and "z". In the vacuum cleaner's resting position, axes "x" and "y" thus fall within a roughly horizontal plane. This plane may be at an incline when the handle is positioned at an incline. However for the purpose of simplifying the following description, we shall call the vertical axis "z", the longitudinal horizontal axis "x" and the transversal horizontal axis "y", with the understanding that this is a description made when the vacuum cleaner is in its resting position or when the cyclonic debris separation and storage device (7) is in a vertical position.

Figure 2:
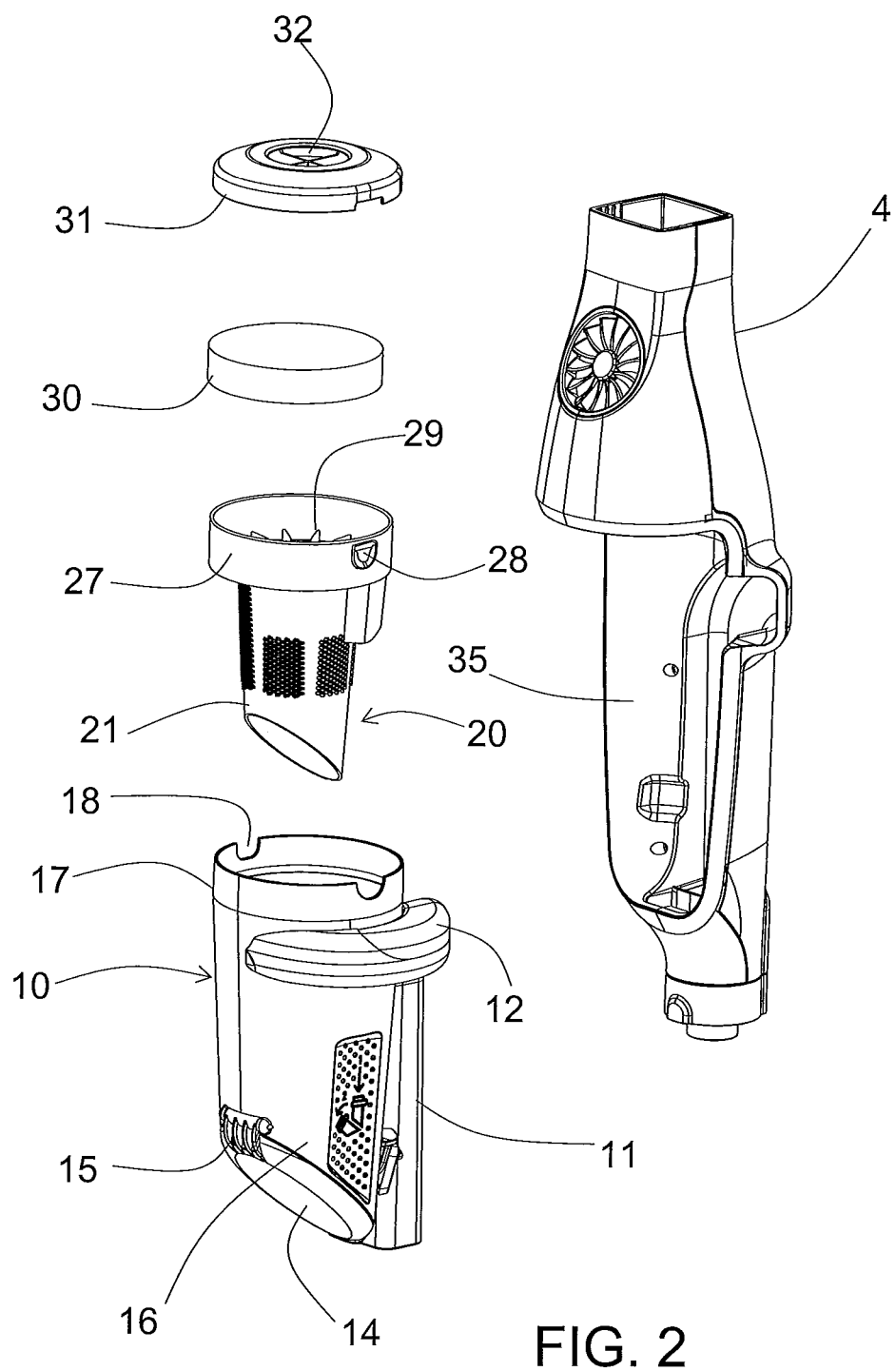
FIG. 2 depicts an exploded view of a cyclonic separation device corresponding to the embodiment of the invention.

The invention pertains to the cyclonic debris separation and storage device (7), an exploded view of which is depicted in FIG. 2, consisting of an exterior structure, which shall be called the bowl (10), within which is a separator filter (20). A foam filter (30) is located in the upper part of the separator filter (20). Finally, the cyclonic separation device is closed off by a cover (31) comprising a circular opening (32) for expelling clean air through its top after the air has been processed by the cyclonic debris separation and storage device (7). This device, once assembled, is positioned in a housing (35) set in the handle (4) of the vacuum cleaner.

Figure 3:
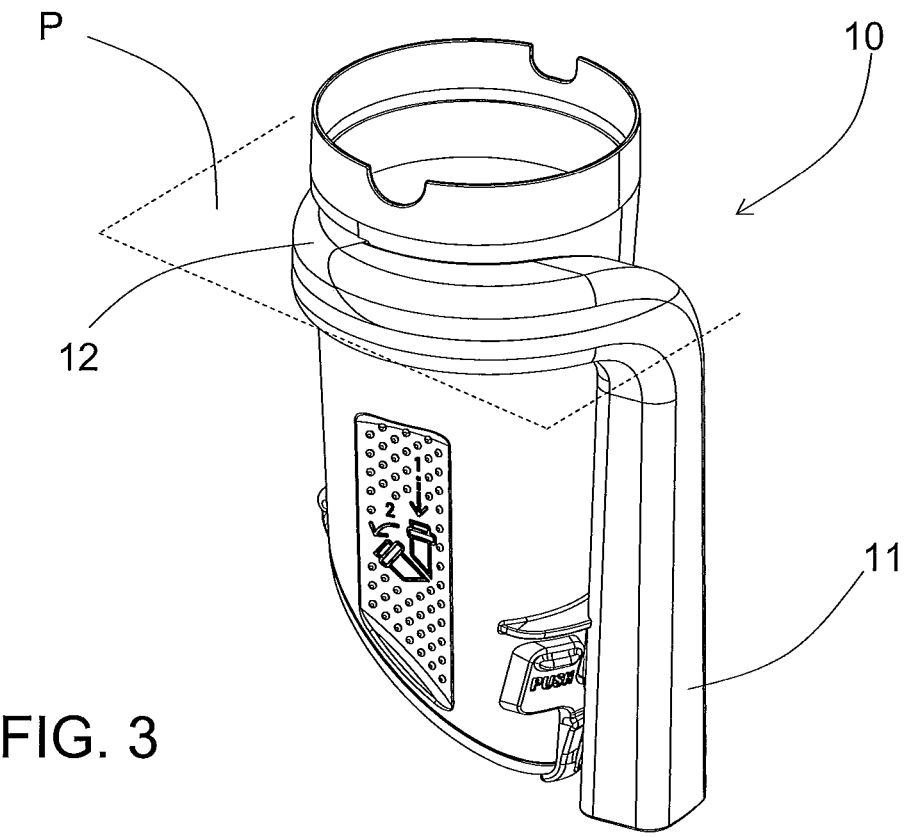
FIG. 3 depicts a perspective view of the bowl of the cyclonic separation device corresponding to the embodiment of the invention.
Figure 4:
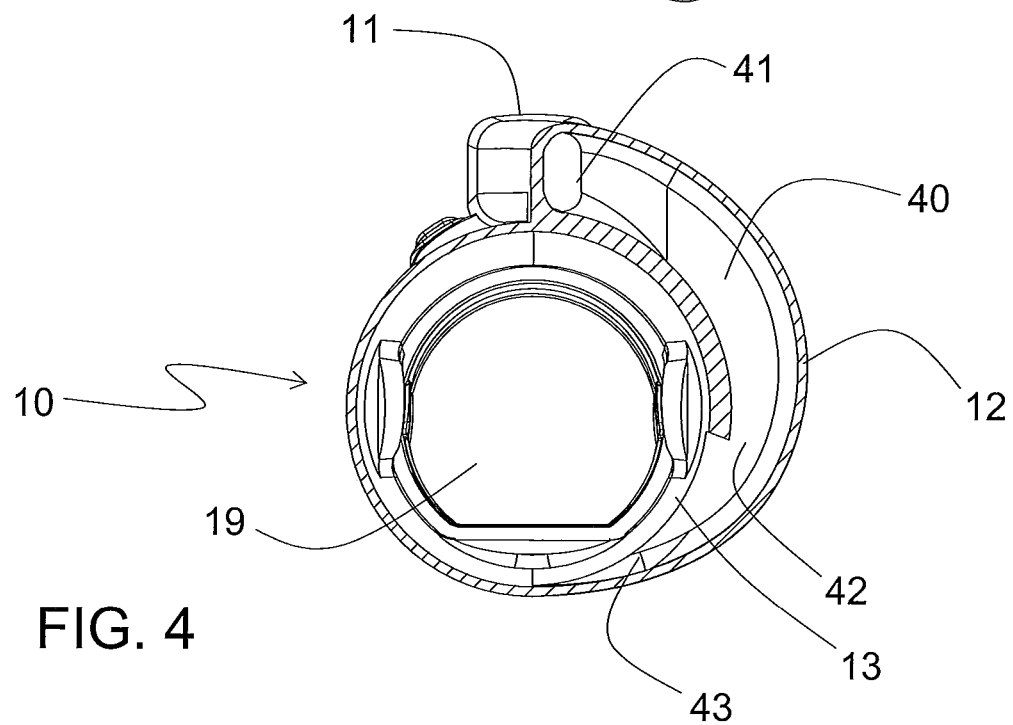
FIG. 4 depicts a plan view of a cross-section of horizontal plane "P" at the location of the acceleration ramp for the bowl of the cyclonic separation device corresponding to the embodiment of the invention.
Figure 5:
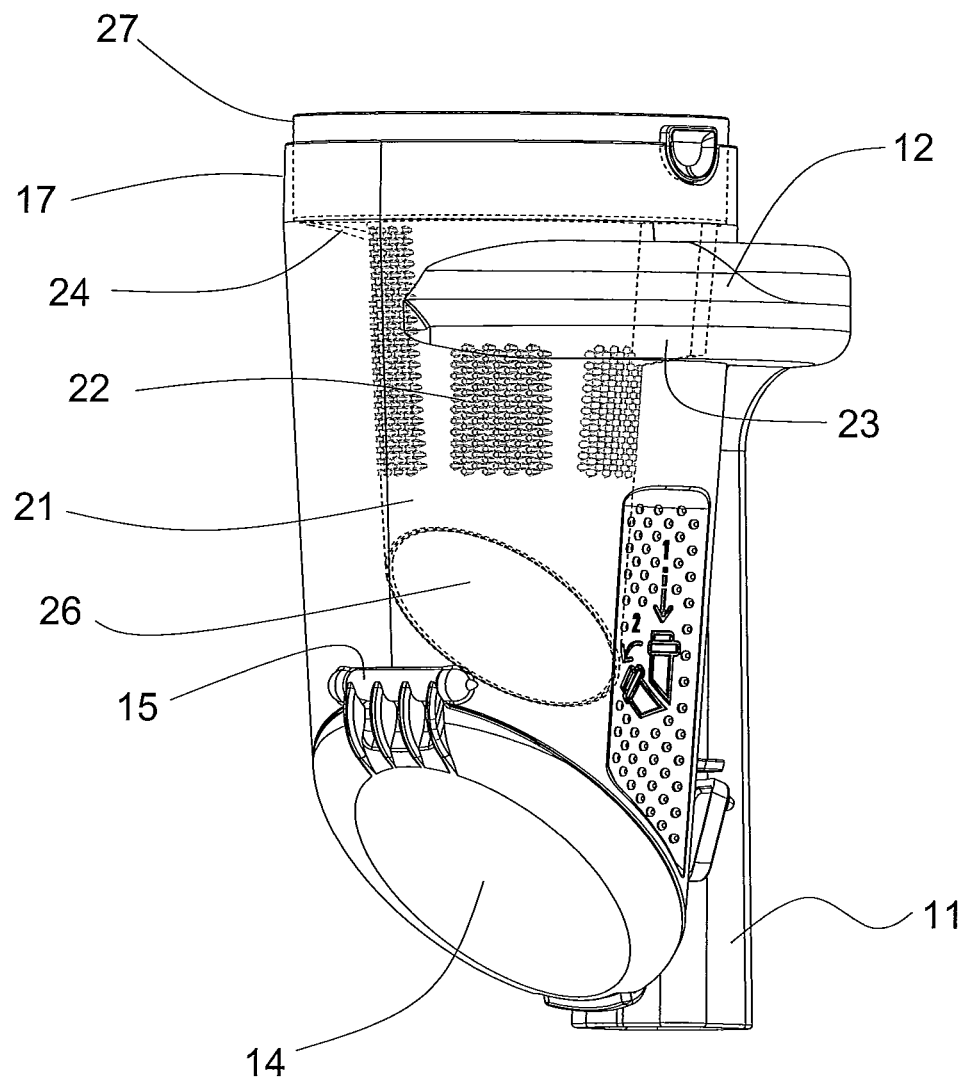
FIGS. 5 and 6 depict two perspective views from two different angles of the cyclonic separation device corresponding to the embodiment of the invention.

The bowl (10) is in the form of a roughly cylindrical structure, which is particularly visible in FIGS. 3 through 5, including an intake (13) in its upper section, visible in FIG. 4, connected to an intake tube directing the airflow from the suction device toward a roughly cylindrical interior chamber (19) of the bowl (10). This intake tube, connected to the bowl (10), comprises a roughly vertical first segment (11), its upper part forming an elbow, followed by a roughly horizontal second segment (12) forming an acceleration ramp (40) for the airflow, visible in FIG. 4, which then enters the interior chamber (19) of the bowl at a speed and in a direction so as to form a vortex flow.

In addition, the vertical first segment (11) advantageously decreases in size from the lower part to the upper part connected to the second segment (12), to further accelerate the airflow.

In fact, the decrease in size of the vertical segment (11) is at least 30% between the intake of the tube and its connection to the second segment (12).

In addition, the elbow is proportioned, particularly at its curved portions attached to the upper and lower segments (11 and 12), to limit turbulence during conduction of airflow. The design specifically excludes angular areas likely to interrupt and create a disturbance in the airflow.

The lower face of the bowl (10) is closed off by a door (14) attached by a hinge (15) for emptying dust and debris that accumulates in the lower section (16) that serves as a storage area. The door (14) has an incline of approximately 45 degrees from horizontal. This incline reduces the speed of the vortex flow into the lower storage portion (16) of the bowl, limiting the disturbance and escape of stored debris. For acceptable results, the incline may range between 20 and 50 degrees.

An essential feature of the invention is the acceleration ramp (40) formed by the horizontal tube segment (12) running at least a quarter of the way around the interior chamber (19) of the bowl (10), and preferably two-fifths of this distance, to constitute a sufficient length to accelerate the incoming airflow. Along this length, which extends from an initial point (41) at the elbow between the vertical segment (11) and the horizontal segment (12) of the intake tube to an end point (42) where the horizontal segment (12) opens to the intake (13) into the cylindrical chamber (19), the tube segment (12) gradually decreases in size by at least 30%, for a reduction in size of over 50% from the bottom of the lower segment (11) visible in FIG. 3, and the end point (42) opening into the chamber (19).

When the airflow arrives at the end point (42) of the acceleration ramp (40) the airflow continues its path through an extension (43) of the outer wall of the tube segment (12), ending at the interior chamber (19) of the bowl at a tangent to this chamber.

According to the described embodiment of the invention, the decrease in width of the tube segment (12) to form the acceleration ramp is gradual. This acceleration ramp could also exist in other forms, with a circular, elliptical, ovoid, rectangular or other type of cross-section.

In addition, this decrease in size may be obtained through various approaches, both linear or non-linear and continuous or interrupted. This tube segment may be manufactured by assembling two half tubes cast separately and then fused together.

Furthermore, this tube segment may be constructed by joining two half tubes, one attached to the bowl and connected to the outline of the bottom of the housing (35) forming the second half tube.

Finally, the tube segment (12) may not be horizontal, but rather inclined downward or upward. The tube segment (12) forming the acceleration ramp is thus positioned around the lateral exterior wall of the primary structure of the bowl defining the interior chamber (19) of the bowl (10), which forms an acceleration ramp without changing the geometry of this primary structure of the bowl or of the interior chamber (19), and without impinging upon its upper part dedicated to the release of processed air.

The tube segment (12) forming the acceleration ramp should preferably remain attached to the external lateral wall of the primary structure of the bowl (10) to avoid increasing the overall dimensions of the bowl (10) while also increasing the stability of the tube segment forming the acceleration ramp, since the tube segment may be attached to the bowl (10) along its full length, or simply rest against the bowl to reduce vibrations. This primary structure of the bowl (10), defining the interior chamber (19), has been depicted as a tubular structure with an exterior cylindrical wall as well as an interior cylindrical wall defining the interior chamber (19). However, the exterior wall of this structure could have a different shape. Also, the interior wall could have a different shape, with a varying circular, or even elliptical or ovoid, cross-section.

Figure 6:
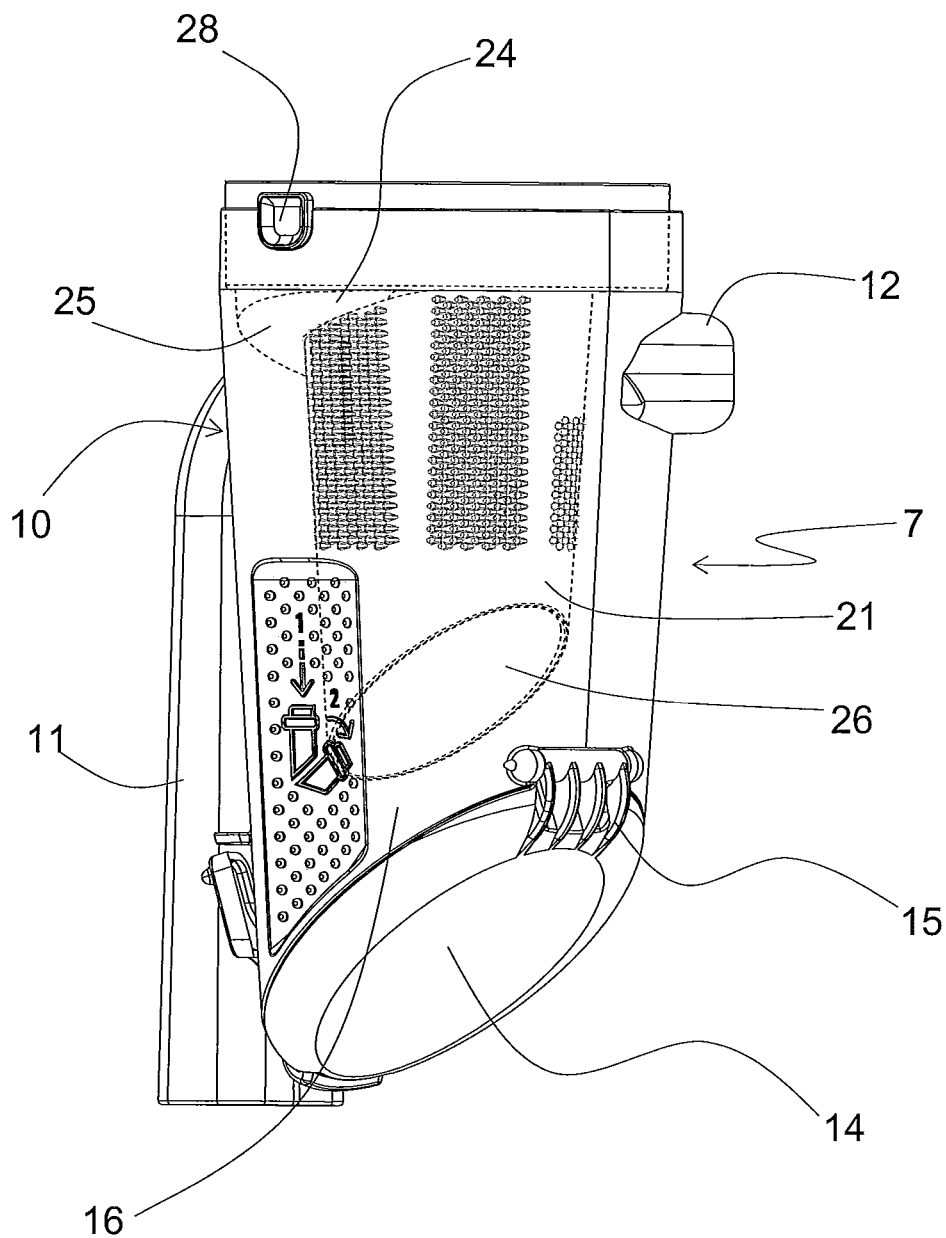

FIGS. 5 and 6 show the assembled cyclonic device, with the separator filter (20) integrated into the central part of the interior chamber (19) of the bowl (10). Its operation is as follows: the flow of contaminated air containing dust and debris coming from the suction device of the vacuum cleaner, flows up through the tube segments (11 and 12) to the intake (13) of the bowl (10), into which it enters at the appropriate speed and in the appropriate direction due to the acceleration generated by the acceleration ramp (40). A ramp (23) and more specifically its interior surface (25), to be described below, forms an upper surface to direct the flow, which is then directed downward under this surface (25) in a helical motion in the space defined by the grill (21) and the lateral wall of the bowl (10) within the interior chamber (19) of the bowl (10), which is also called the cyclonic chamber (19). This vortex movement continues toward the bottom of the bowl (10), with the debris gradually being propelled toward the lateral walls of the bowl (10) by centrifugal force before falling into the storage area (16) depicted by the lower part of the bowl (10). The airflow at the bottom of the bowl (10) reverses direction and rises back through the center of the device under the grill (21) with an ascending vortex motion before rising along the lateral walls of the grill (21) to finally pass through the open areas (22) located in the lateral wall of the grill (21) to rise up to the interior of this filtration grill (21). During this upward motion, the remaining fine dust particles suspended in the airflow will be trapped either in the space (26) under the grill (21) or by the openings (22) of the grill (21).

Figure 7:
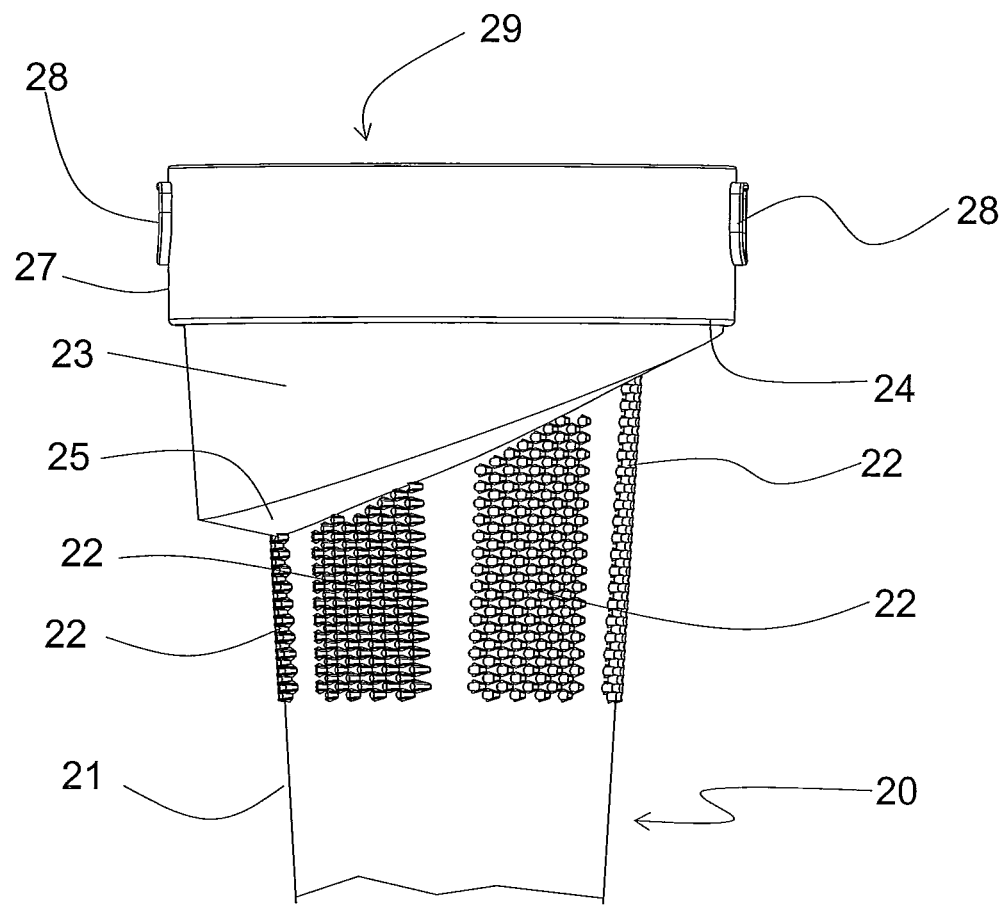
FIG. 7 depicts a view of one side of a separator for the cyclonic separation device corresponding to the embodiment of the invention.

FIG. 7 depicts the upper part of the separator filter (20), which includes, in its upper section, a cylindrical cover (27) with a diameter roughly corresponding to the diameter of the upper part (17) of the bowl (10), to ensure a tight mechanical seal between these two elements once they are assembled, as depicted in FIG. 6. Tabs (28) located around the exterior circumference of the cylindrical cover (27) of the separator filter (20) correspond to the recesses (18) on the upper part of the bowl (10), thereby ensuring proper positioning and attachment of the two elements. The cylindrical lid (27) of the separator filter forms an upper housing (29) in which a disc-shaped foam filter (30) is housed. The separator filter also comprises a filtration grill (21) that is roughly cylindrical in shape with a smaller diameter than the cover (27), which extends below this cover and into the central part of the cyclonic chamber (19) as described above. This filtration grill (21) comprises areas (22) with small openings around its circumference, to allow for airflow as well as air filtration.

The separator filter (20) also comprises an element forming the ramp (23), which we will simply call "ramp," with a spiral shape, positioned under the cover (27) of the separator filter. This ramp (23) extends from a starting point (24) at the bottom surface of the cover (27) such that the end point of the ramp is located near the air intake (13) of the bowl (10) when the cyclonic device is assembled. This ramp (23) then extends downward in roughly a half circle, occupying roughly all of the space between the grill (21) and the lateral wall of the bowl (10) as shown in FIG. 6. The bottom surface (25) of this ramp (23) thus forms a spiral-shaped surface to guide incoming airflow, initiating the vortex motion of the air downward around the grill (21). The downward slope of this guide surface guarantees that the airflow, after having made its first loop around the interior grill (21) in the cyclonic chamber (19), does not collide with the air entering through the opening (13) of the bowl, but rather continues downward on its vortex path. In addition, the guide surface (25) of the ramp (23) has a second incline of 10-15 degrees toward the outside, this incline being particularly visible in FIG. 8. The incline forms a slope extending from the filter (21) toward the wall of the bowl (10) that helps to guide the airflow toward the wall of the bowl (10), thus increasing the centrifuge effect of the rotation speed and preventing contaminated air from passing through the openings (22) of the filtration grill (21) in this initial processing phase within the device.

Of course the invention is not limited to the geometry of the ramp (23) selected in this embodiment of the invention. In fact, this ramp may extend from at least one quarter to a full circle around the cylinder, with a minimum of a half circle being preferable. In addition, its incline toward the outside is advantageous since it reduces the difference in diameter between the grill (21) and the bowl (10), i.e., the difference between the grill (21) and the wall of the bowl (10), while still providing an acceptable solution. An angle of incline ranging between 5 and 20 degrees is acceptable, with the angle being measured based on a plane perpendicular to the plane tangential to the grill (21) at the level of the guide surface (25). However, this incline is optional and not mandatory.

It is advantageous for the ramp (23) to be attached directly to the separator filter (20) because it allows the final operational configuration of the cyclonic separation device to be assembled using a small number of individual elements. This ramp may be obtained directly during casting and may form a single piece with at least the cylindrical cover (27) of the separator filter (20) or, in a variation, be manufactured separately then attached by any method to the separator filter.

The different components of the separator filter may have different geometries without falling outside of the scope of the invention. Thus, the filtration grill (21) may not be cylindrical, but rather have a varying circular cross-section, such as one that decreases toward the bottom as represented in the depicted embodiment, in which the grill is, more specifically, a conical cross-section. This cross-section may also be different in shape, such as elliptical or ovoid. The descriptor "roughly cylindrical" has been used to encompass these possible variations. The cover (27) may also be different in shape (rectangular, square, elliptical, etc).

Figure 8:
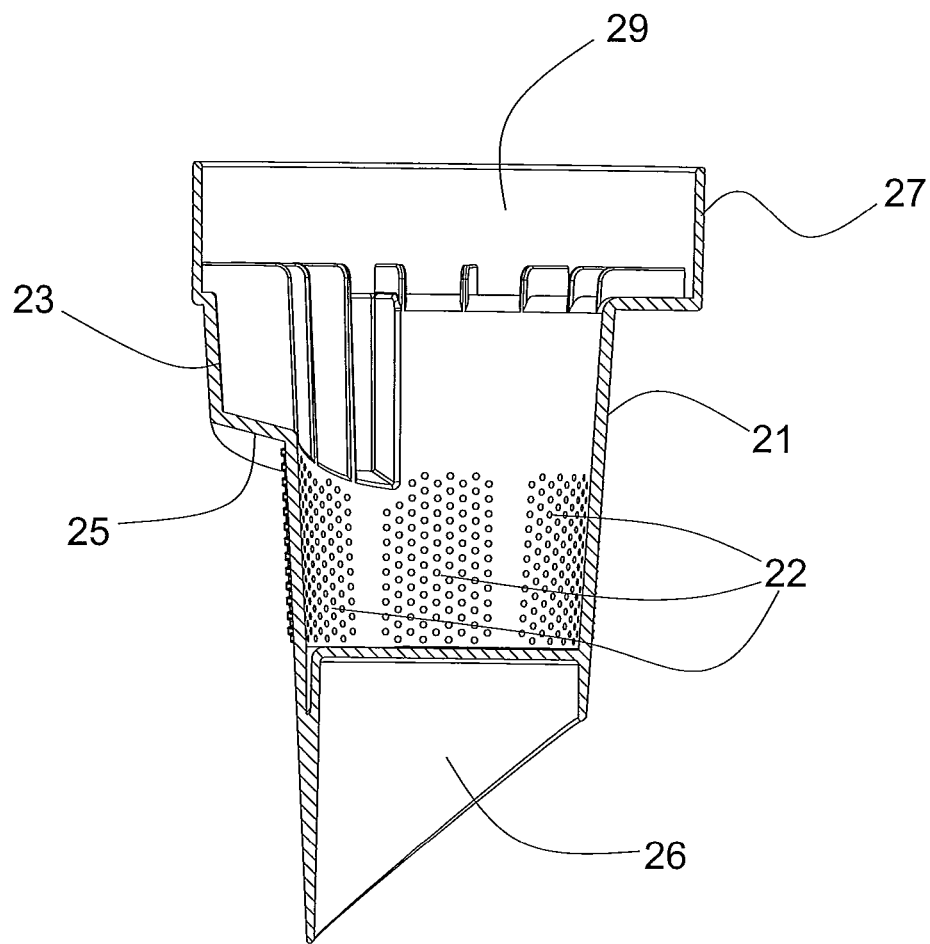
FIG. 8 depicts a cross-section of the separator for the cyclonic separation device corresponding to the embodiment of the invention.

FIG. 8 depicts the separator filter (20) in cross-section and also depicts the lower portion of the filter corresponding to this embodiment of the invention. The lower part of the cylindrical grill (21) forms an enclosed area (26) defined by the bottom of the grill (21) and the lateral surfaces of the cylinder or cone ending at an inclined plane, at approximately 45 degrees, roughly parallel to the lower door of the bowl (10). This geometry provides greater volume than in prior art solutions, in which the cylinder ends at a horizontal plane near the bottom of the grill, while also being esthetically pleasing.

Figure 9:
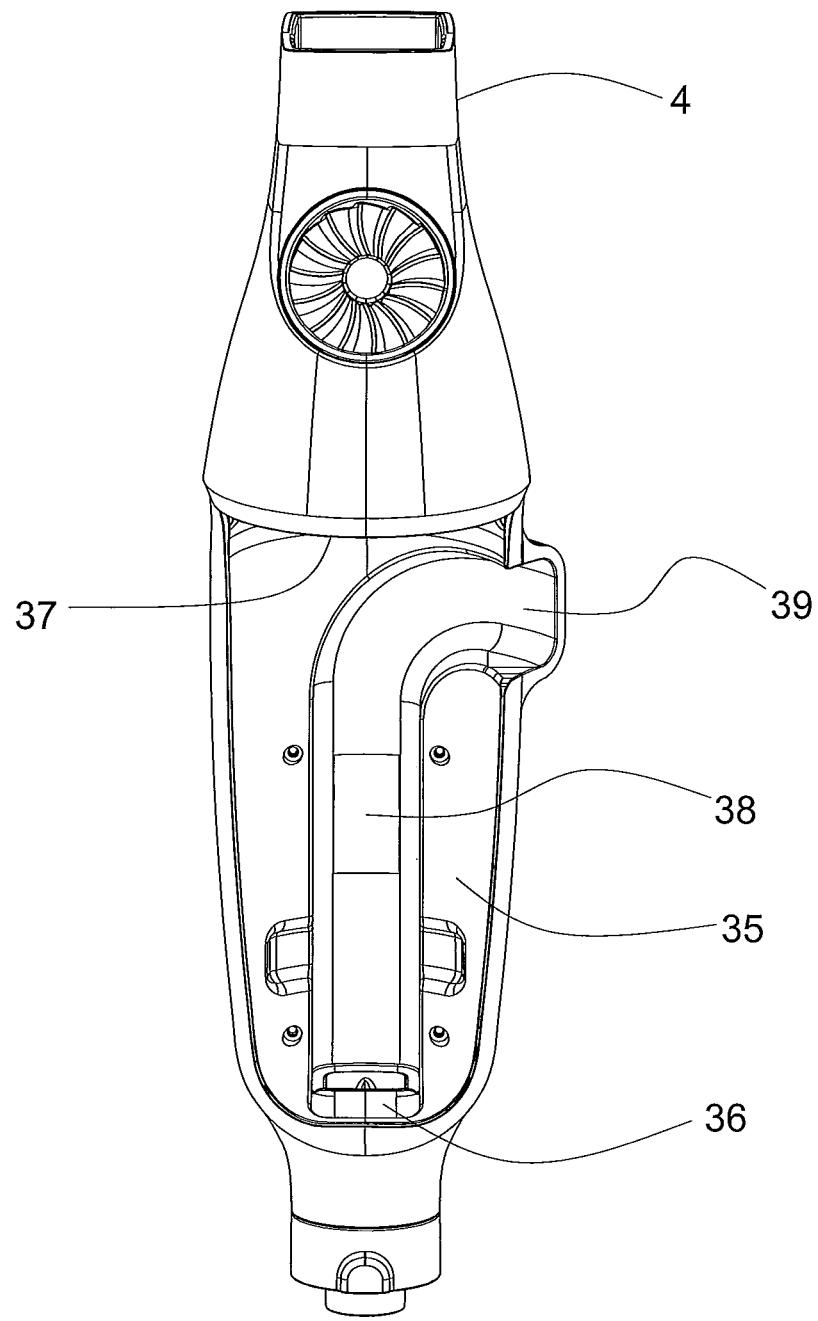
FIG. 9 depicts the housing of the frame of the vacuum cleaner that holds the cyclonic separation device corresponding to the embodiment of the invention.

FIG. 9 depicts the portion of the frame of the handle (4) of the vacuum cleaner forming a housing (35) for the cyclonic separation device. This housing includes a connector (36) on its lower part, at the end of a vertical vacuum tube (40) extending from the suction device (2). This connection is designed to attach to the vertical tube (11) attached to the bowl (10) to form a continuous vertical vacuum tube. In addition, this housing (35) has a second connector (37) in its upper part to attach to the motor for the vertical airflow leaving the cyclonic separation device through the hole in the center of the cover (32). The bottom of the housing (35) comprises a vertical recess (38) to receive part of the vertical tube (11) of the cyclonic separation device and a vertical recess (39) to receive part of the horizontal tube (12) from the cyclonic separation device and thus allow sufficient insertion of the cyclonic separation device within the handle (4) of the vacuum cleaner, such that its primary structure is in line with the rest of the handle (4) while at least partially concealing the tube segments (11 and 12) for an attractive appearance.

Such a structure helps guide the bowl (10) as it is being repositioned in the device.

With this solution, replacement and removal of the cyclonic separation device (7) in the handle (4) of the vacuum cleaner is simple and pleasant, which facilitates emptying the debris stored in the device.

The cyclonic separation device is replaced by positioning the lower end of the vertical tube (11) into its connector (36) in the lower part of the housing (35), then rotating the entire device toward the bottom of the housing (35) while pushing the cyclonic separation device downward to cause a lower segment of tube (11) to retract downward, while retracting a mobile part held into place by a spring, until the entire cyclonic separation device comes into contact with the bottom of the housing (35). Releasing the downward pressure allows the mobile part to rise back upward under the effect of the its return spring, bringing with it the cyclonic separation device, which becomes pressed against the upper part of the housing (35), sufficiently tightly to guarantee a good upper connection (32, 37) for the release of processed air, while ensuring ongoing operation and performance of the cyclonic separation device within the handle (4). The device is removed following the reverse procedure, by first pressing it downward, then rotating it toward the front.

The invention was depicted in the context of usage in an upright vacuum cleaner. However, the scope of the invention is compatible with any vacuum cleaner of any power, even high powered vacuum cleaners using between 1,500 and 1,800 watts, regardless of the vacuum cleaner operating mode, whether battery-powered or connected to a power source. In these cases, the dimensions of the device shall be adapted to the conditions governing airflow. In addition, the cyclonic separation device may be used as the sole separator of debris, or in combination with a filter bag, as in a tank vacuum cleaner, so as to reduce the volume of debris reaching the bag and thus reduce the unpleasantness of maintenance operations for this solution.

While specific embodiments of the invention have been described in detail, it will be appreciated by those skilled in the art that various modifications and alternatives to those details could be developed in light of the overall teachings of the disclosure. The presently preferred embodiments described herein art meant to be illustrative only and not limiting as to the scope of the invention which is to be given the full breadth of the appended claims and any and all equivalents thereof.

The invention claimed is:

1. A vacuum cleaner, comprising a substantially cylindrical interior cyclonic chamber connected to an air intake, including a separator filter located in a central part of the interior cyclonic chamber, the separator filter configured to separate dust and debris from airflow, said device further comprising an intake tube having a vertical first segment fixed to the cyclonic chamber with an upper part forming an elbow followed by a horizontal second segment forming an acceleration ramp for airflow that extends around an outer surface of the interior cyclonic chamber, wherein the horizontal second segment directs airflow to the air intake and extends from a starting point to an end point near the air intake, with a cross-section of the horizontal second segment near the end point being smaller than the cross-section of the horizontal second segment near the starting point in order to form the acceleration ramp for airflow between the starting point and the end point, and wherein the vacuum cleaner comprises a handle forming a housing for the device for cyclonic separation that includes a vertical recess for receiving the vertical first segment and a horizontal recess extending from the vertical recess for receiving a first portion of the horizontal second segment such that the first portion of the horizontal second segment is positioned within the housing and a second portion of the horizontal second segment extends outside of the housing.

2. The vacuum cleaner as described in claim 1, wherein the horizontal second segment to direct the airflow toward the air intake of the cyclonic chamber extends at least one quarter of the way around the cyclonic chamber.

3. The vacuum cleaner as described in claim 1, wherein the horizontal second segment to direct the airflow toward the air intake of the cyclonic chamber extends at least two-fifths of the way around the cyclonic chamber.

4. The vacuum cleaner as described in claim 1, wherein the horizontal second segment to direct the airflow toward the air intake of the cyclonic chamber extends from the air intake around an outer surface of the cyclonic chamber such that the tube segment is substantially perpendicular to a shaft extending between the cyclonic separation device and a handle of the vacuum cleaner.

5. The vacuum cleaner as described in claim 1, wherein the vertical first segment has a cross-section that decreases in size and extends vertically along an outer surface of the cyclonic chamber towards the handle.

6. The vacuum cleaner as described in claim 1, including a bowl defining the cyclonic chamber, with the bowl holding the horizontal second segment.

7. The vacuum cleaner as described in claim 6, wherein the bowl comprises a tubular structure with a cylindrical lateral exterior surface defining the cyclonic chamber and in that the horizontal second segment is fixed to the cylindrical lateral exterior surface of the tubular structure of the bowl.

8. The vacuum cleaner as described in claim 6, wherein the bowl comprises an inclined, hinged lower section forming a door.

9. A vacuum cleaner comprising a suction device connected to a handle by an intermediate section, the handle comprising a housing installed therein to hold a cyclonic separation device for dust and debris, said cyclonic separation device comprising a substantially cylindrical interior cyclonic chamber connected to an air intake, including a separator filter located in a central part of the interior cyclonic chamber, the separator filter configured to separate dust and debris from airflow, said device further comprising an intake tube having a vertical first segment fixed to the cyclonic chamber with an upper part forming an elbow followed by a horizontal second segment forming an acceleration ramp for airflow that extends around an outer surface of the interior cyclonic chamber, wherein the horizontal second segment directs airflow to the air intake and extends from a starting point to an end point near the air intake, with a cross-section of the horizontal second segment near the end point being smaller than the cross-section of the horizontal second segment near the starting point in order to form the acceleration ramp for airflow between the starting point and the end point, wherein the housing comprises a vertical recess for receiving the vertical first segment and a horizontal recess extending from the vertical recess for receiving a first portion of the horizontal second segment such that the first portion of the horizontal second segment is positioned within the housing and a second portion of the horizontal second segment extends outside of the housing.

10. An upright vacuum cleaner, comprising a housing installed in the handle to hold a cyclonic separation device, said cyclonic separation device comprising a substantially cylindrical interior cyclonic chamber connected to an air intake, including a separator filter located in a central part of the interior cyclonic chamber, the separator filter configured to separate dust and debris from airflow, said device further comprising an intake tube having a vertical first segment fixed to the cyclonic chamber with an upper part forming an elbow followed by a horizontal second segment forming an acceleration ramp for airflow that extends around an outer surface of the interior cyclonic chamber, wherein the horizontal second segment directs airflow to the air intake and extends from a starting point to an end point near the air intake, with a cross-section of the horizontal second segment near the end point being smaller than the cross-section of the horizontal second segment near the starting point in order to form the acceleration ramp for airflow between the starting point and the end point, wherein the housing comprises a vertical recess for receiving the vertical first segment and a horizontal recess extending from the vertical recess for receiving a first portion of the horizontal second segment such that the first portion of the horizontal second segment is positioned within the housing and a second portion of the horizontal second segment extends outside of the housing.

* * * * *